(12) United States Patent
Tanaka

(10) Patent No.: US 10,820,164 B2
(45) Date of Patent: Oct. 27, 2020

(54) DISPLAY OF GROUP CHANGE TO USER IN RESPONSE TO RECEIPT OF CHANGE OF ASSOCIATION INFORMATION

(71) Applicant: FUJI XEROX CO., LTD., Tokyo (JP)

(72) Inventor: Kazuya Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/541,324

(22) Filed: Aug. 15, 2019

(65) Prior Publication Data

US 2020/0304960 A1    Sep. 24, 2020

(30) Foreign Application Priority Data

Mar. 20, 2019 (JP) ................................. 2019-053849

(51) Int. Cl.
  *H04W 4/08* (2009.01)
  *H04W 8/18* (2009.01)
  *H04L 29/06* (2006.01)
  *H04L 29/08* (2006.01)

(52) U.S. Cl.
  CPC ............. *H04W 4/08* (2013.01); *H04L 63/104* (2013.01); *H04L 67/36* (2013.01)

(58) Field of Classification Search
  CPC ......... H04W 4/08; H04W 4/10; H04W 84/08; H04W 76/45; H04W 12/0052; H04W 8/18; H04W 8/186; H04L 65/4061; H04L 12/1818; H04L 63/104; H04L 65/403; H04L 65/4038
  USPC .......................................... 455/518, 519, 520
  See application file for complete search history.

(56) References Cited

U.S. PATENT DOCUMENTS 10,419,894 B2 *  9/2019  Cheng ..................... H04W 4/08
2006/0111135 A1 *  5/2006  Gray .................... H04L 65/4061
                                                               455/519
2007/0143859 A1   6/2007  Ogi et al.

FOREIGN PATENT DOCUMENTS

JP        2007-172280 A    7/2007

* cited by examiner

*Primary Examiner* — Philip Sobutka
(74) *Attorney, Agent, or Firm* — Oliff PLC

(57) ABSTRACT

An information processing apparatus includes a management unit, a receiver, and a display controller. The management unit is configured to manage association information in which a user and a group to which the user belongs are associated with each other. The receiver is configured to receive a change of the association information. The display controller configured to control group change information to be displayed to the user. The group change information indicate contents of a group change that the receiver estimates in response to receipt of the association information.

19 Claims, 17 Drawing Sheets

DISPLAY OF GROUP CHANGE TO USER IN RESPONSE TO RECEIPT OF CHANGE OF ASSOCIATION INFORMATION

CROSS-REFERENCE TO RELATED APPLICATIONS

This application is based on and claims priority under 35 USC 119 from Japanese Patent Application No. 2019-053849 filed Mar. 20, 2019.

BACKGROUND (i) Technical Field

The present disclosure relates to an information processing apparatus, an information processing system, and a non-transitory computer readable medium.

(ii) Related Art

In an information processing apparatus for managing a user account, a user and a group to which the user belongs may be associated with each other and managed as account information.

JP-A-2007-172280 discloses an access authority management apparatus which includes an account comparison unit, a change information generation unit, a change request notification unit, a change information presentation unit, and an access authority replacement unit. In this access authority management apparatus, the account comparison unit determines a deleted group by comparing account information before and after a change of an organization. The change information generation unit extracts groups in which a ratio of members of the deleted group is a predetermined value or more, from groups after the change of an organization, and determines the extracted groups to be replacement destination candidates for the deleted group. The change request notification unit notifies a necessity to change an access authority to an owner of an object who has been given the access authority for the deleted group. The change information presentation unit presents the replacement destination candidates for the deleted group, and causes a user to select a replacement destination from the candidates. The access authority replacement unit rewrites an access control list of an ACL management unit according to the selection result.

SUMMARY

When a change of an organization occurs, there may be a necessity to change a group to which a user belongs. However, while it is possible to determine whether a group is an old group or a new group, details of the change of groups such as whether the name of a group itself is changed or a division or integration occurs may not be determined. As a result, a difficulty may occur in determining an authority assigned to each group for a specific device or data.

Aspects of non-limiting embodiments of the present disclosure relate to providing an information processing apparatus, etc., which manages a user and a group to which the user belongs in association with each other and is able to estimate group change information that is contents of a group change in response to a change of association information in which the user and the group to which the user belongs are associated with each other.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a management unit configured to manage association information in which a user and a group to which the user belongs are associated with each other; a receiver configured to receive a change of the association information; and a display controller configured to control to display group change information toward the user, in which the group change information indicates contents of a group change that the receiver estimates in response to receipt of the association information.

BRIEF DESCRIPTION OF THE DRAWINGS

Exemplary embodiment(s) of the present disclosure will be described in detail based on the following figures, wherein.

DETAILED DESCRIPTION

Hereinafter, exemplary embodiments of the present disclosure will be described in detail with reference to the accompanying drawings.

<Description of Entire Information Processing System>

Figure 1:
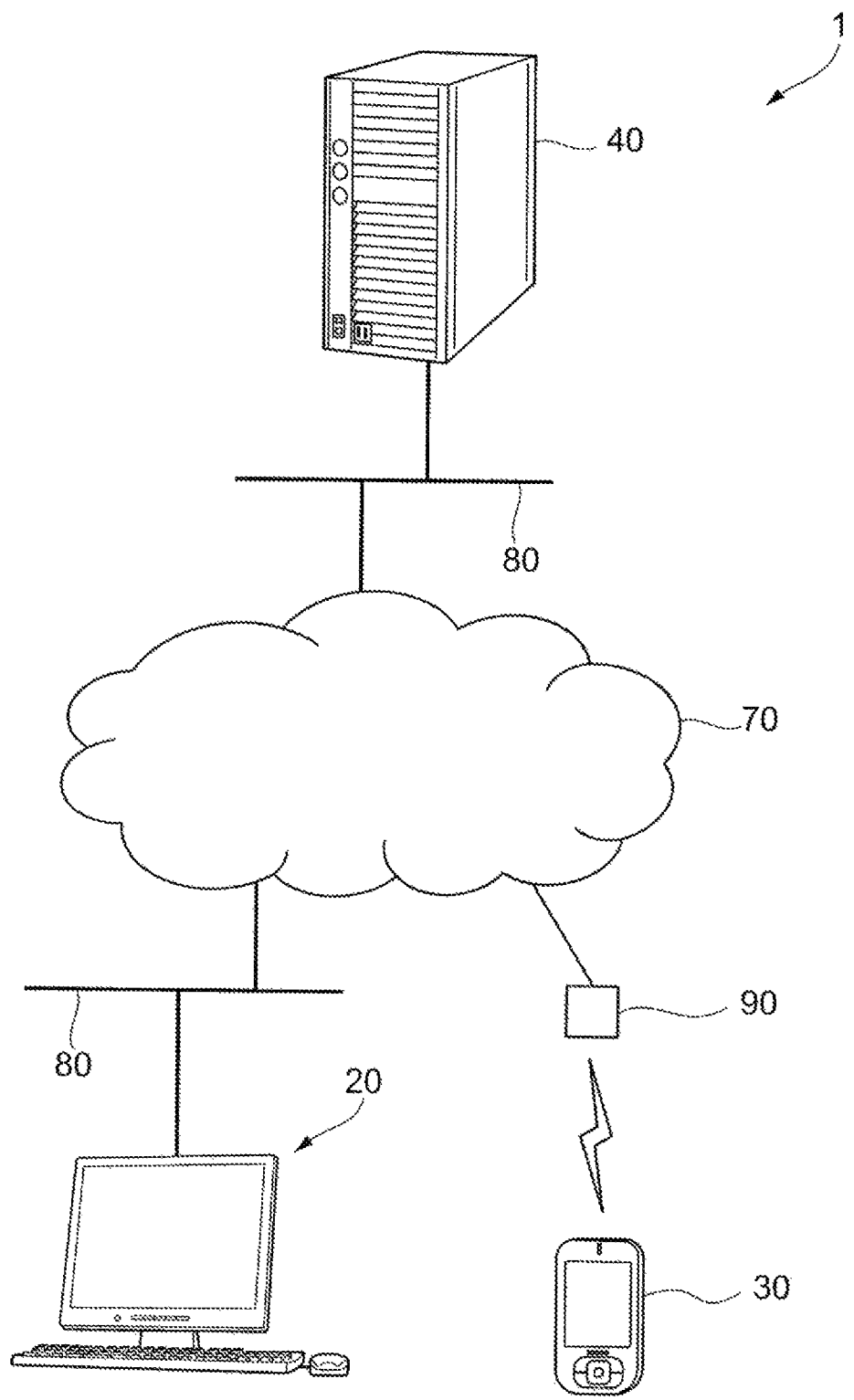
FIG. 1 is a view illustrating an example of a configuration of an information processing system according to an exemplary embodiment of the present disclosure.

FIG. 1 is a view illustrating an example of a configuration of an information processing system 1 according to an exemplary embodiment of the present disclosure.

As illustrated, the information processing system 1 according to the present exemplary embodiment is configured in the manner that terminal devices 20 and 30 and a management server 40 are connected to each other via networks 70 and 80 and an access point 90.

In addition, herein, "electronic information" indicates information obtained by computerizing specific information. The "electronic information" is not particularly limited in type, format, data structure, etc. of information as long as the information may be handled by each of the terminal devices 20 and 30 and the management server 40. The "electronic information" includes, for example, electronic documents such as character information and image information, software such as a program, and information on software such as setting information, etc.

In addition, while FIG. 1 illustrates one terminal device 20 and one terminal device 30, plural terminal devices 20 and plural terminal devices 30 may be provided.

The terminal device 20 is, for example, a general-purpose personal computer (PC). Further, the terminal device 20 operates various types of application software under the control of the operation system (OS), such that generation, browsing, etc. of electronic information are performed.

The terminal device 30 is, for example, a mobile terminal such as a mobile computer, a mobile phone, a smartphone or a tablet. The terminal device 30 accesses the network 70 that conducts a wired communication, via the access point 90 that accesses the terminal device 30 that conducts a wireless communication. Further, the terminal device 30 operates various types of application software, such that generation, browsing, etc. of electronic information are performed.

The management server 40 is an example of an information processing apparatus, an example of an information management unit that manages electronic information, and a server computer that manages the entire information processing system 1. For example, the management server 40 performs a user authentication of each of the terminal devices 20 and 30, and transmits electronic information to the terminal devices 20 and 30. Further, the management server 40 receives electronic information from the terminal devices 20 and 30, and stores the received electronic information.

Each of the terminal devices 20 and 30 and the management server 40 includes a central processing unit (CPU) which is an arithmetic operation unit, a main memory which is a storage unit, and a storage such as a hard disk drive (HDD) or a solid state drive (SSD). Here, the CPU executes various types of software such as the OS (basic software) and application software. In addition, the main memory is a storage area for storing various types of software, data used for the execution thereof, etc., and the storage is a storage area for storing input data to various types of software, output data from various types of software, etc.

Further, each of the terminal devices 20 and 30 and the management server 40 includes a communication interface that communicates with the outside (hereinafter, referred to as a "communication I/F"), a display mechanism including a video memory, a display or the like, and an input device such as a keyboard, a mouse or a touch panel. The display mechanism functions as a display that displays electronic information when the electronic information is browsed.

The network 70 is a communication unit used for an information communication among the terminal devices 20 and 30 and the management server 40, and is, for example, the Internet.

Similarly to the network 70, the network 80 is also a communication unit used for an information communication among the terminal devices 20 and 30 and the management server 40, and is, for example, a local area network (LAN).

<Schematic Description of Operation of Information Processing System 1>

Figure 2:
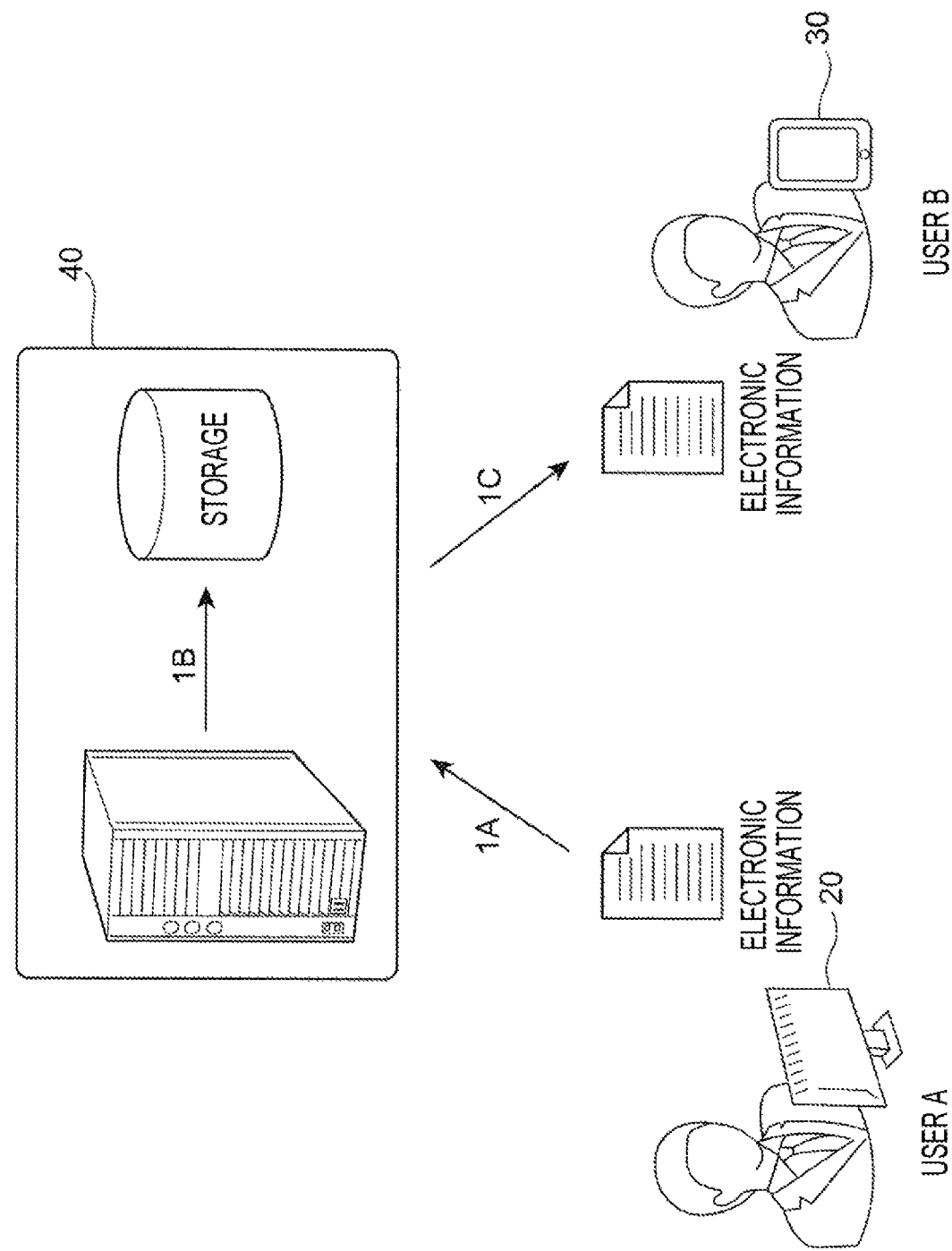
FIG. 2 is a view illustrating an example of a schematic operation of the information processing system.

FIG. 2 is a view illustrating an example of a schematic operation of the information processing system 1.

In addition, in this example, descriptions will be made on a case where a user A creates a material in the terminal device 20, electronic information generated as a result is sent to the management server 40, and further, a user B who operates the terminal device 30 browses the electronic information.

First, the user A operates software such as a browser that operates in the terminal device 20, to perform a user authentication to the management server 40. Then, the user A uploads the data of the material to the management server 40 (1A). Information on the material is document data created by document creation software or the like, and is an example of the electronic information.

When the information on the material is received, the management server 40 stores the information on the material in the above-described storage or the like (1B).

Then, the user B operates software such as a browser that operates in the terminal device 30, to perform a user authentication to the management server 40. Then, the user B may download the information on the material stored in the management server 40, and browse the contents of the material (1C).

As a result, for example, the user B may browse the electronic information and check the contents even outside or at other locations.

At this time, the management server 40 may set an authority to, for example, browse the electronic information for a user. That is, when the authority to, for example, browse the electronic information is not set, the contents of the electronic information which is prohibited from being published may be, for example, browsed, and the information processing system 1 may not be said to be a secure system. The authority may be set for each user or, for example, may be set for each group to which each user belongs. That is, the authority to, for example, browse the electronic information is set for each group, and users who belong to the group have the same authority to, for example, browse the electronic information. In this case, the management server 40 manages an account of a user and a group as association information in which the account of the user and the group are associated with each other. That is, the "association information" is information in which an account of a user and a group are associated with each other.

Figure 3:
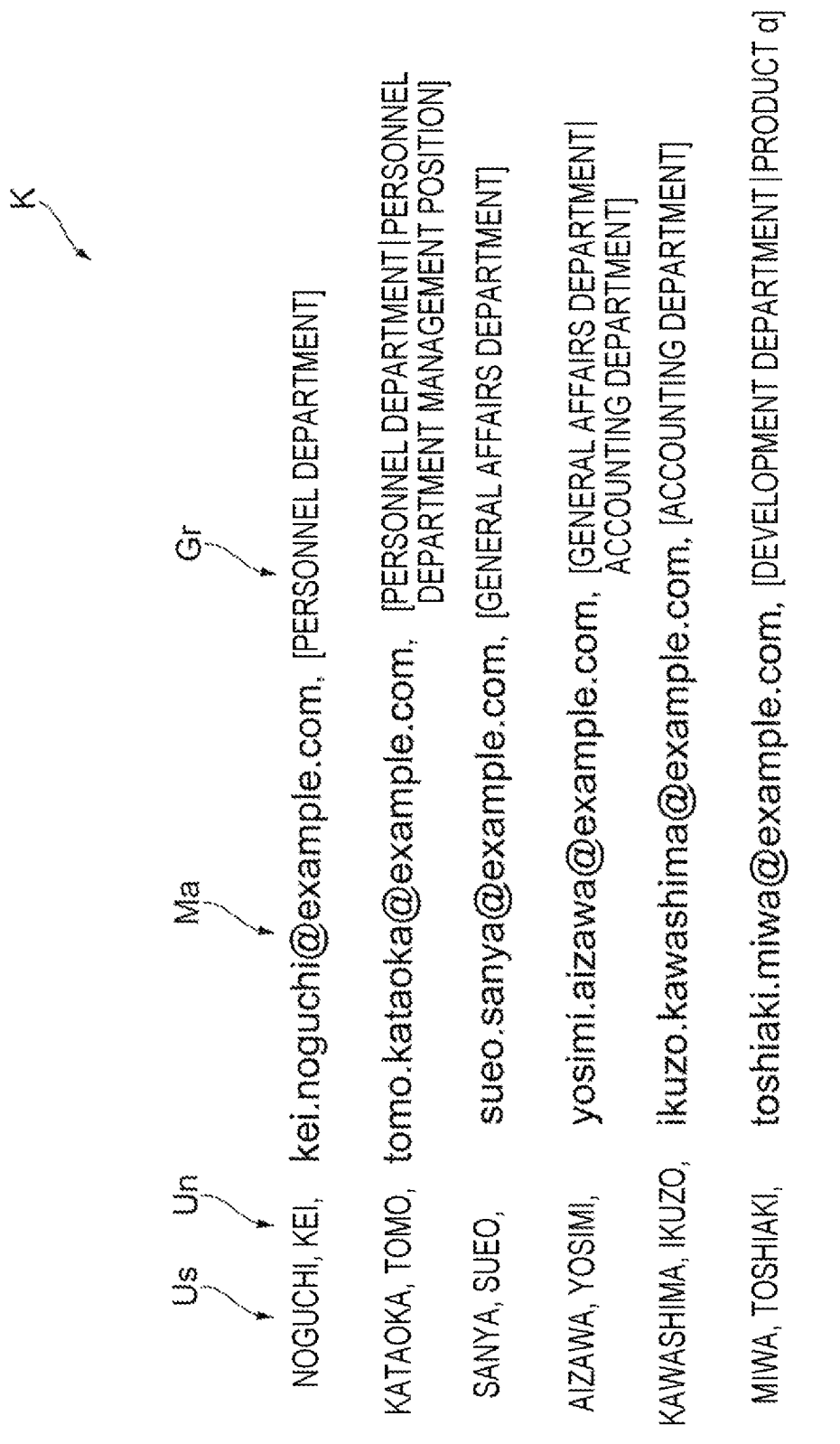
FIG. 3 is a view illustrating a data structure of association information which is management information managed by a management server when an account of a user and a group are associated with each other.

FIG. 3 is a view illustrating a data structure of the association information which is management information managed by the management server 40 when an account of a user and a group are associated with each other.

As illustrated, association information K includes a first name Us of a user, a second name Un of the user, a mail address Ma which is an account of the user, and a group name Gr, and is set for each user in a CSV format. For example, the first line indicates that the first name Us of the user is "Noguchi", the second name Un of the user is "Kei", and the user of the user name "Kei Noguchi" has the mail address Ma of "kei.noguchi@example.com" and belongs to the "Personnel Department" which is the group name Gr. In addition, the group name Gr includes not only the name of the group itself to which the user belongs, but also a title or the like of the user. Further, the group name Gr is written between parenthesis symbols "[" and "]". In addition, the group name Gr may include plural group names, and a symbol "l" is interposed between adjacent group names Gr. When plural group names are written in this way, this indicates that the user has the plural group names Gr. For example, in the second line, the user of the user name "Tomo Kataoka" has the group names Gr of "Personnel Department|Personnel Department Management Position", and this indicates that the user is in the personnel department management position of the personnel department.

In this case, when the user performs an authentication, the management server 40 refers to the association information illustrated in FIG. 3, and acquires the group corresponding to the account of the user. Then, the management server 40 gives the user an authority set for the group.

Description of Functional Configuration of Information Processing System 1

First Exemplary Embodiment

Next, a first exemplary embodiment of the information processing system 1 will be described. In the first exemplary embodiment, descriptions will be made on a case where the management server 40 estimates a change of a group and enables the user to check the estimated contents.

Figure 4:
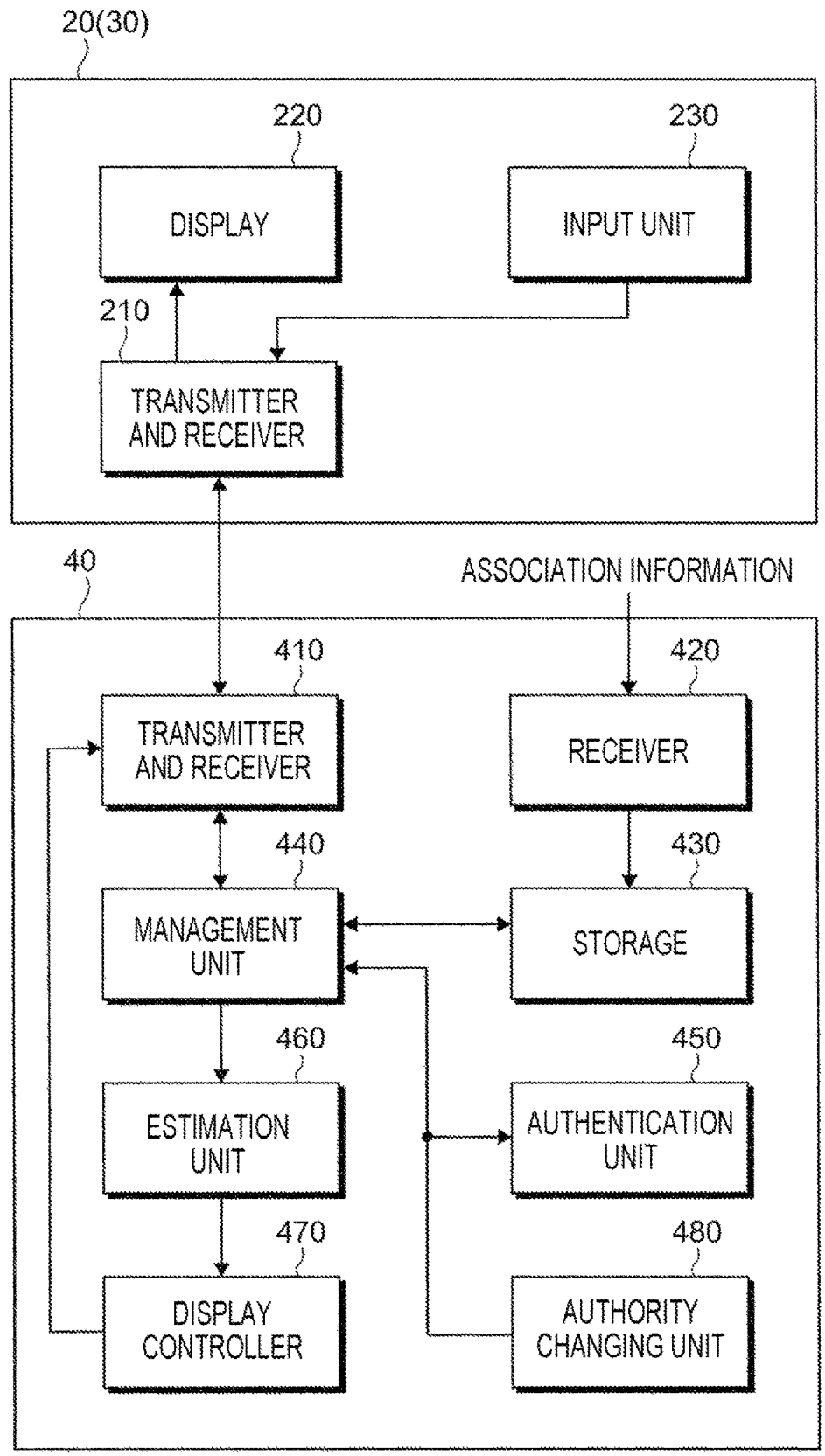
FIG. 4 is a block diagram illustrating a functional configuration according to a first exemplary embodiment of the information processing system.

FIG. 4 is a block diagram illustrating a functional configuration according to the first exemplary embodiment of the information processing system 1.

In addition, here, FIG. 4 selectively illustrates functions related to the present exemplary embodiment, among various functions possessed by the information processing system 1.

As illustrated, the terminal device 20 includes a transmitter and receiver 210 that communicates with the management server 40, a display 220 that displays information to the user, and an input unit 230 that receives an input from the user. In addition, the terminal device 30 also has the same configuration as that of the terminal device 20.

The transmitter and receiver 210 is, for example, a communication I/F, and performs a request for a user authentication to the management server 40 by transmitting information such as a user account and a password necessary for the user authentication. Further, the transmitter and receiver 210 transmits and receives information on a change of a group to and from the management server 40.

The display 220 is, for example, a display mechanism, and displays contents of electronic information using document creation software or image processing software. Thus, the user may edit electronic information while checking the contents of the electronic information.

The input unit 230 is, for example, an input device, and receives a user instruction. In this case, the user instruction is, for example, an instruction to request an authentication of the user. As another example, the user instruction is a correction instruction to correct a change of a group.

In addition, as illustrated, the management server 40 includes a transmitter and receiver 410 that communicates with the terminal devices 20 and 30, a receiver 420 that receives a change of the association information, a storage 430 that stores the association information, a management unit 440 that manages the association information, an authentication unit 450 that determines a user authentication, an estimation unit 460 that estimates a change of a group, a display controller 470 that generates group change information which is information on an estimated group change, and an authority changing unit 480 that changes an authority to be given to a user.

The transmitter and receiver 410 is, for example, a communication I/F, and receives a request for a user authentication from the terminal devices 20 and 30. Further, the transmitter and receiver 410 transmits and receives information on a change of a group to and from the terminal devices 20 and 30.

The receiver 420 is an example of a receiver, and receives a change of the association information. The receiver 420 is, for example, an input device, and receives a change of the association information by an administrator as a user.

The storage 430 is, for example, a storage, and stores the association information as illustrated in FIG. 3. Further, the storage 430 also stores electronic information, a password necessary for a user authentication, etc.

The management unit 440 is an example of a management unit, and manages the association information that is information in which a user and a group to which the user belongs are associated with each other. Specifically, the management unit 440 generates and adds the association information as illustrated in FIG. 3 for a new user. In addition, for example, when a user does not need to be managed because of a retirement or the like, the association information for the user is deleted. Further, when a change occurs in a group, a change of the association information is performed by a method to be described later in detail.

The authentication unit 450 is, for example, an authentication mechanism. When the transmitter and receiver 410 receives a request for a user authentication, the authentication unit 450 performs a user authentication based on the information, such as a user account and a password, which is sent from the terminal devices 20 and 30. That is, the authentication unit 450 refers to the storage 430 for the user account sent from the terminal devices 20 and 30, and determines whether the password sent from the terminal devices 20 and 30 matches the password stored in the storage 430. Then, when the passwords match each other, the authentication is permitted, and when the passwords do not match each other, the authentication is not permitted.

When a change occurs in a group to which a user belongs, the estimation unit 460 estimates details of the change such as whether only the group name is changed or a division or integration occurs, for the group. Details of the estimation will be described later.

The display controller 470 generates group change information which is the estimated contents of the group change. In addition, the display controller 470 is an example of a display controller, and performs a control to display the group change information toward the user. That is, the "group change information" represents contents estimated by the estimation unit 460 with respect to the details of the group change. The display controller 470 performs a control to display the group change information by the display mechanism to the administrator as the user. That is, in this case, the user to whom the group change information is displayed is a person who has input the change of the association information. In addition, when a change occurs in the group to which the user belongs, the display controller 470 generates the group change information to be displayed on the terminal devices 20 and 30, in order to enable the user to check the group change information. Then, the display controller 470 performs a control to transmit the group change information to the terminal devices 20 and 30 via the transmitter and receiver 410. That is, in this case, the user to whom the group change information is displayed is a user related to the change of the association information.

The authority changing unit 480 is an example of an authority changing unit, and changes an authority of a user for a specific device or data based on the association information. That is, the authority changing unit 480 gives the same authority to browse electronic information, to each of users who belong to the same group according to the association information.

The management unit 440, the authentication unit 450, the estimation unit 460, the display controller 470, and the authority changing unit 480 are implemented by, for example, a CPU.

Next, the operation of the information processing system 1 illustrated in FIG. 4 will be described.

Figure 5:
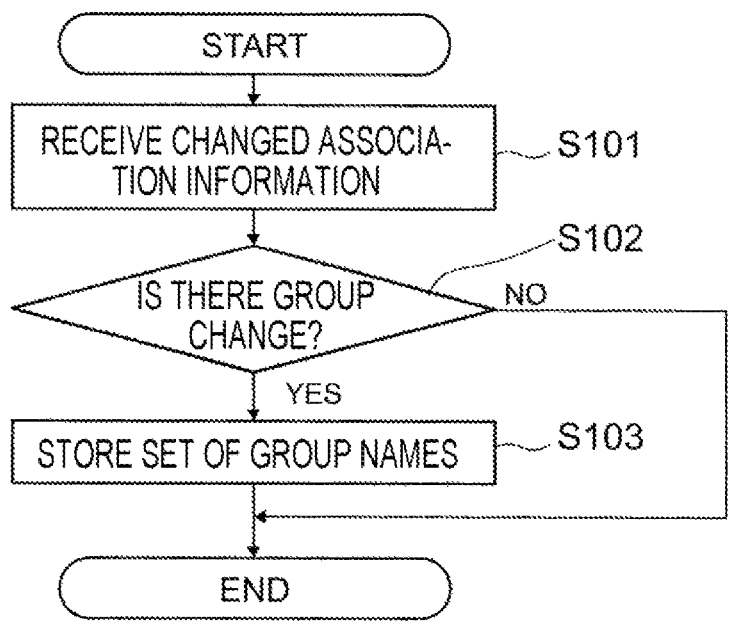
FIG. 5 is a flowchart for explaining a process performed when an administrator inputs changed association information, as an operation of the information processing system.

FIG. 5 is a flowchart for explaining a process performed when the administrator inputs changed association information, as the operation of the information processing system 1.

First, when a group change occurs, the administrator of the management server 40 inputs the changed association information. The receiver 420 receives the changed association information (step 101).

Next, the management unit 440 acquires the pre-changed association information from the storage 430, and compares the pre-changed association information with the changed association information (step 102). In this case, it is determined whether a group change occurs, for each user.

As a result, when it is determined that a group change occurs (Yes in step 102), the management unit 440 stores a set of the pre-changed data and the changed data for the group name Gr (see FIG. 3) among the association information stored in the storage 430 (step 103).

Meanwhile, when no group change occurs (No in step 102), the series of processes are ended without changing the association information stored in the storage 430.

Figure 6:
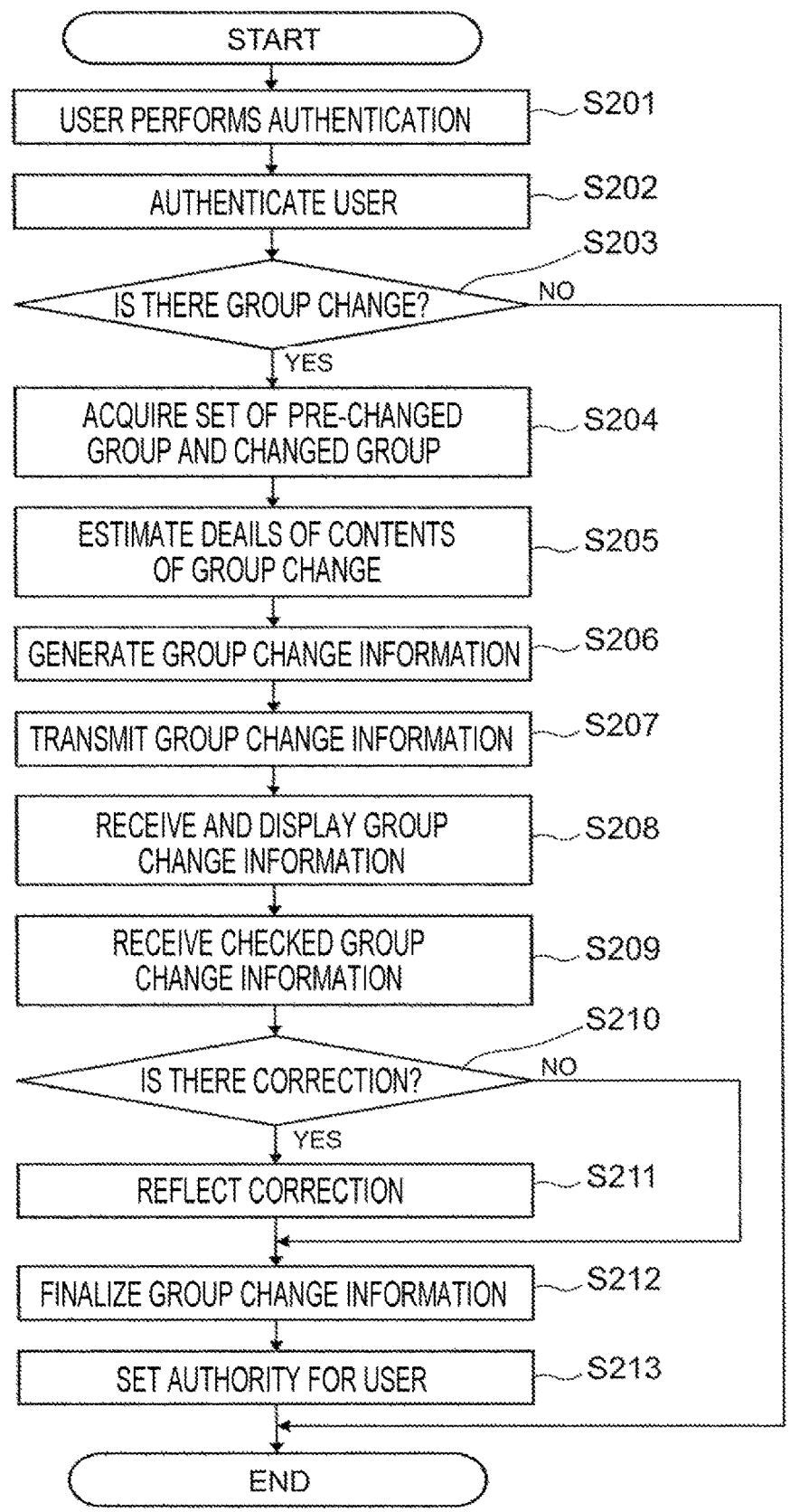
FIG. 6 is a flowchart for explaining a process of enabling a user to check group change information, as an operation of the information processing system according to the first exemplary embodiment.

FIG. 6 is a flowchart for explaining a process of enabling the user to check the group change information, as the operation of the information processing system 1 according to the first exemplary embodiment.

Here, descriptions will be made on a case where the group change information is checked by the user who operates the terminal device 20.

First, the user who operates the terminal device 20 performs an authentication to the management server 40 (step 201). The authentication is performed in the manner that the user starts application software such as a browser that operates in the terminal device 20 using the input unit 230, and inputs the user account and the password by the input unit 230 while viewing a screen displayed on the display 220. Then, the user account and the password are sent from the transmitter and receiver 210 to the management server 40, and received by the transmitter and receiver 410 of the management server 40.

Then, the authentication unit 450 authenticates the user based on the user account and the password (step 202).

Next, the management unit 440 refers to the storage 430, and determines whether a group change occurs, for the authenticated user (step 203).

As a result, when it is determined that no group change occurs (No in step 203), the series of processes are ended.

Meanwhile, when it is determined that a group change occurs (Yes in step 203), the management unit 440 acquires a set of the pre-changed group and the changed group, for the user (step 204).

Then, the estimation unit 460 estimates details of the contents of the group change such as whether only the group name is changed or a division or integration occurs, for the group in which the change occurs (step 205).

Next, the display controller 470 generates group change information that represents the estimated contents of the group change (step 206).

Further, the transmitter and receiver 410 transmits the group change information to the terminal device 20 (step 207).

In the terminal device 20, the transmitter and receiver 210 receives the group change information, and the display 220 performs a display (step 208).

Then, the user who views and checks the group change information makes a correction when there is a correction to be made. Then, the management unit 440 receives the checked group change information via the transmitter and receiver 210 of the terminal device 20 and the transmitter and receiver 410 of the management server 40 (step 209).

Then, the management unit 440 confirms whether the user makes a correction to the group change information (step 210).

As a result, when it is determined that the user makes a correction (Yes in step 210), the management unit 440 reflects the group change information corrected by the user, so as to finalize the group change information (step 211). Thereafter, the process proceeds to step 212.

Meanwhile, when it is determined that the user makes no correction (No in step 210), the management unit 440 finalizes the group change information checked by the user (step 212). That is, the group change information is finalized by steps 211 and 212. Accordingly, the management unit 440 functions as a finalization unit that enables the user to check the group change information, and finalizes the association information based on the checked group change information.

Then, the authority changing unit 480 sets an authority for the user based on the group change information (step 213). That is, the authority changing unit 480 does not change an authority for a user who has no group change, and changes an authority for a user who has a group change, based on the group change information.

When a group change occurs, and for example, when the group change is a name change of the group, for example, the authority of the group before the name change is identically given as the authority of the group after the name change. In addition, for example, when the group change is a division of a group, for example, a new authority is given to each divided group. Further, for example, when the group change is an integration of groups, for example, the respective authorities that have been given to the plural integrated groups are collectively given.

Figure 7A:
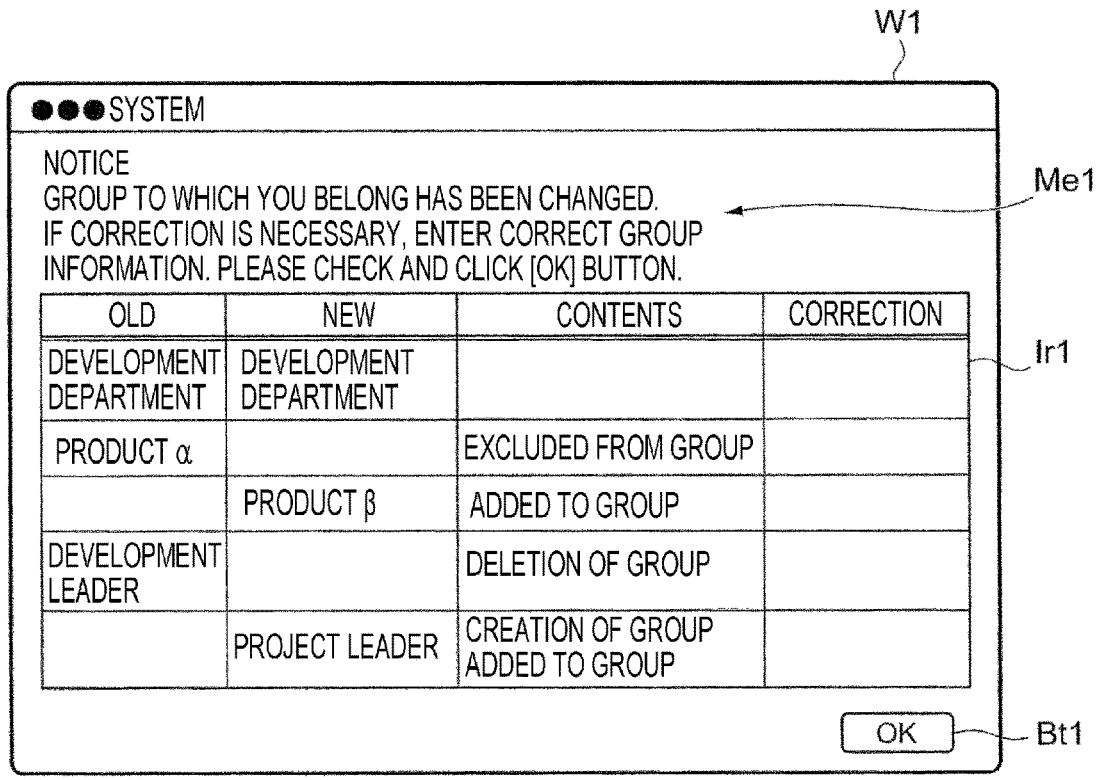
FIGS. 7A and 7B are views illustrating a case where group change information is displayed according to the first exemplary embodiment.
Figure 7B:
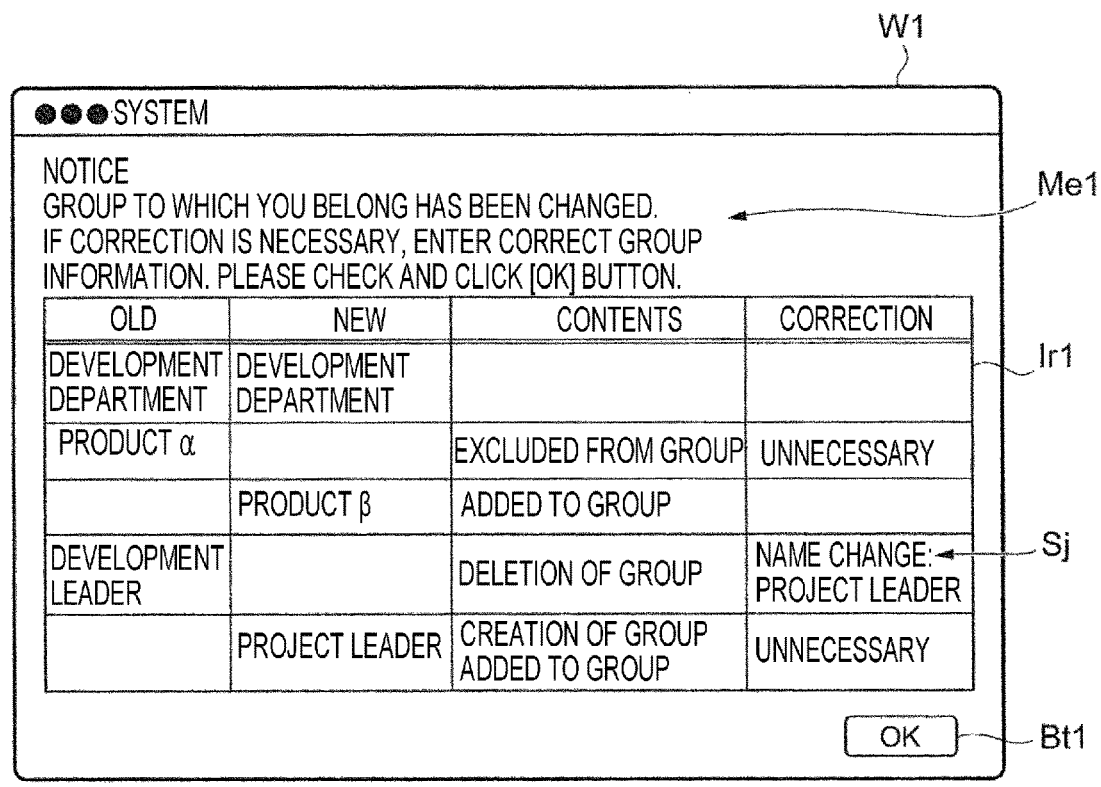

FIGS. 7A and 7B illustrate a case where the group change information is displayed according to the first exemplary embodiment.

As described above, the display controller 470 of the management server 40 generates the group change information in step 206 of FIG. 6, and the display 220 of the terminal device 20 displays the generated group change information in step 208.

FIG. 7A illustrates a case where the group change information is displayed as a window W1 in the display 220. In the illustrated window W1, a message Me1 for the user is displayed in the upper portion of the window W1. Further, a list Ir1 of specific contents of a group change which are estimated by the estimation unit 460 is displayed in the lower portion of the window W1.

The message Me1 includes contents that request the authenticated user to check the group change information, and the user who views the message Me1 determines whether the contents of the list Ir1 are correct. Here, it is indicated that the authenticated user is changed from a development leader of a product "α" of the development department as indicated in "Old" to a project leader of a product "β" of the development department as indicated in "New". That is, the pre-changed group is the development leader of the product "α" of the development department, and the changed group is the project leader of the product "β" of the development department. This corresponds to a specific example of the set of the pre-changed group and the changed group which is acquired in step 204 of FIG. 6.

In addition, here, the field "Contents" displays the details of the group change which are estimated by the estimation unit 460. In this case, the estimation unit 460 estimates that the user is excluded from the group of the product "α" and added to the group of the product "β". In addition, the estimation unit 460 estimates that the development leader is deleted, and the project leader is newly created and added.

Then, the user who checks the group change information presses an OK button Bt1 when the contents are correct. Meanwhile, when the contents are incorrect, the user performs a correction as follows.

FIG. 7B illustrates a case where the user inputs corrections Sj when the user corrects the group change information.

In this case, FIG. 7B illustrates a case where the user inputs specific corrections Sj to the field "Correction". That is, the user inputs "Unnecessary" for the contents indicating that the user is excluded from the group of the product "a". Further, the user inputs that the change of the development leader is not the deletion but is a name change to the project leader. Further, the user inputs "Unnecessary" for the new creation and addition of the project leader. The corrections Sj are sent as correction information to the management server 40. That is, the "correction information" is information that represents the contents of corrections made by the user to the group change information generated by the display controller 470 from the estimation of the estimation unit 460.

Additionally, the group change information may be finalized by the administrator who inputs the changed association information in the step of FIG. 5. In this case, the screens described in FIGS. 7A and 7B for each user are displayed using the display mechanism or the like connected to the management server 40. Then, the administrator performs corrections as in FIG. 7B. However, there may exist a user who does not know about the group change by the administrator. In this case, the management unit 440 may skip the process for the user, and then, when the user performs an authentication, the management unit 440 may enable the authenticated user to check the group change as described above. That is, when there is the group change information that has not been finalized by the user who input the association information (for example, the administrator), the management unit 440 enables the user related to the change of the association information to finalize the group change information.

Second Exemplary Embodiment

Next, a second exemplary embodiment of the information processing system 1 will be described. In the second exemplary embodiment, descriptions will be made on a case where the authenticated user is enabled to check the group change information on not only the authenticated user but also another user who belongs to the same group as that of the authenticated user.

Figure 8:
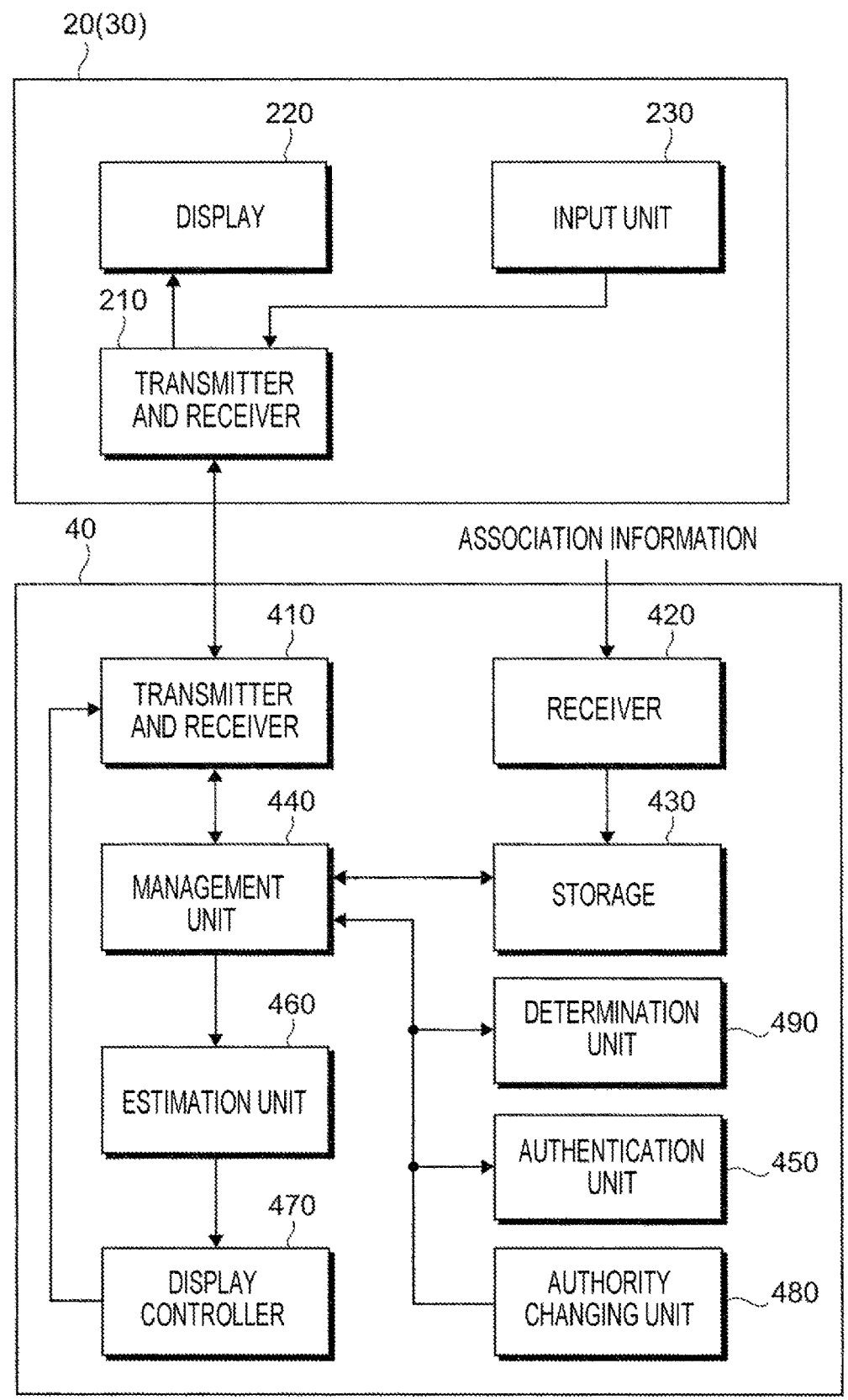
FIG. 8 is a block diagram illustrating a functional configuration according to a second exemplary embodiment of the information processing system.

FIG. 8 is a block diagram illustrating a functional configuration according to the second exemplary embodiment of the information processing system 1.

The information processing system 1 of the present exemplary embodiment is identical to that of the first exemplary embodiment illustrated in FIG. 4, but different therefrom in that the information processing system 1 of the present exemplary embodiment includes a determination unit 490 that determines a change range of the group change information. Thus, hereinafter, descriptions will be made focusing on the determination unit 490.

The determination unit 490 determines a range of users when the group change information is checked by a user. In the second exemplary embodiment, the authenticated user is enabled to check not only the group change information on the authenticated user but also the group change information on another user. That is, the determination unit 490 expands the range of users who are enabled to check the group change information.

Another user is, for example, a user who belongs to the same group as that of the authenticated user.

More specifically, another user is, for example, a user who has the same group change as that of the authenticated user. That is, another user is a user whose pre-changed group and changed group are the same as those of the authenticated user. In addition, the present disclosure is not limited to this example, and the pre-changed group of another user may be different from that of the authenticated user. Further, another user may be a user who belongs to a group related to a change of the association information but is not recorded in the received change of the association information. That is, by performing an authentication, the user whose association information has been changed may be enabled to check the group change information on another user who belongs to the same group as that of the authenticated user but has no record of a change in the association information.

For the users who belong to the same group, a user is highly likely to recognize the history of the group change even for the other user. In that case, when the authenticated user is enabled to check the group change information for another user as well, the process of checking the group change information is more effectively performed.

Figure 9:
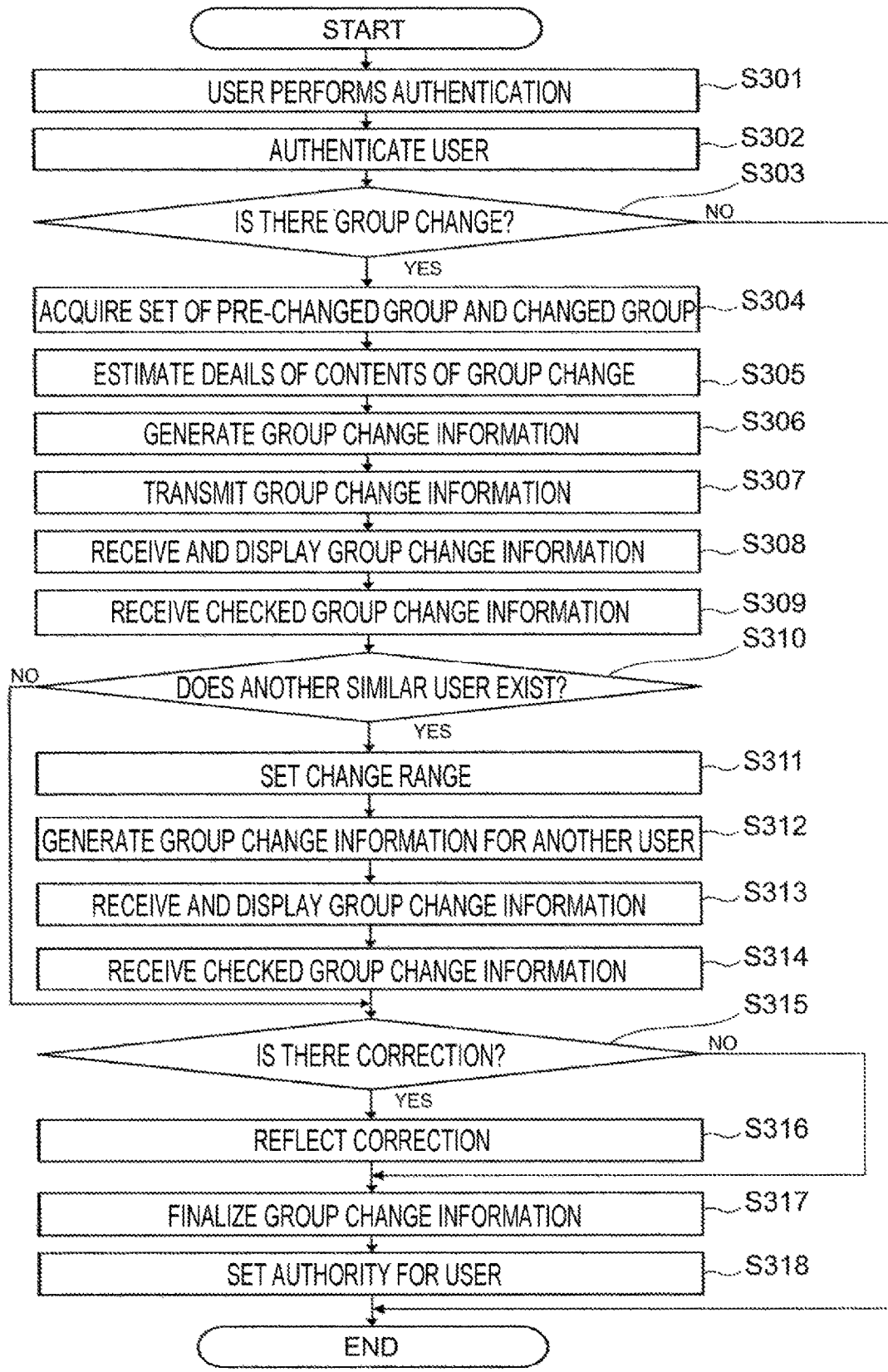
FIG. 9 is a flowchart for explaining a process of enabling a user to check group change information, as an operation of the information processing system according to the second exemplary embodiment.

FIG. 9 is a flowchart for explaining a process of enabling the user to check the group change information, as the operation of the information processing system 1 according to the second exemplary embodiment.

Additionally, since steps 301 to 309 are the same as steps 201 to 209 described above with reference to FIG. 6, descriptions thereof will be omitted. Here, descriptions will be made on a case where the authenticated user is also enabled to check the group change information for another user who has the same group change as that of the authenticated user.

In and after step 310, the determination unit 490 refers to the storage 430, and searches whether there exists another user who has the same group change as that of the authenticated user (step 310). That is, the determination unit 490 investigates whether there exists another user whose pre-changed group and changed group are the same as those of the authenticated user.

As a result, when it is determined that there exists another user (Yes in step 310), the determination unit 490 sets this user as the change range of the group change information, in addition to the authenticated user (step 311). Then, the display controller 470 generates the same group change information as that of the authenticated user, for another user (step 312).

Further, the transmitter and receiver 410 transmits the group change information to the terminal device 20, and in the terminal device 20, the transmitter and receiver 210 receives the group change information such that the display 220 performs a display (step 313).

Then, the user who views the group change information checks the group change information for another user, and performs a correction when there is a correction to be made. Then, the management unit 440 receives the checked group change information via the transmitter and receiver 210 of the terminal device 20 and the transmitter and receiver 410 of the management server 40 (step 314).

Subsequent steps 315 to 318 are the same as steps 210 to 213 described above with reference to FIG. 6.

Figure 10:
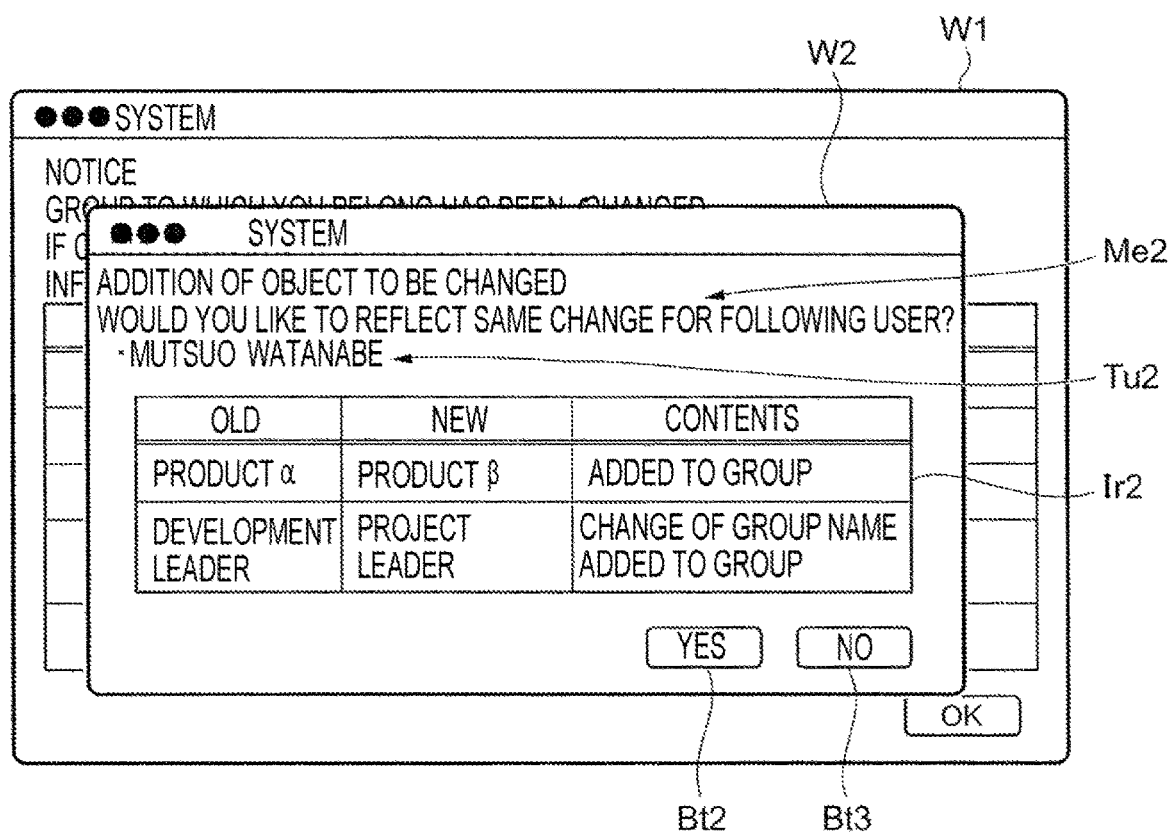
FIG. 10 is a view illustrating group change information for another user.

FIG. 10 is a view illustrating the group change information for another user.

As described above, the display controller 470 of the management server 40 generates the group change information for another user in step 312 of FIG. 9, and displays the group change information on the display 220 of the terminal device 20 in step 313.

FIG. 10 illustrates a case where the group change information on another user is displayed as a window W2 on the display 220. In this case, the window W2 is displayed to be superimposed on the window W1 of FIGS. 7A and 7B. In the illustrated window W2, a message Me2 for the user is displayed in the upper portion of the window W2. Further, a list Ir2 of specific contents of the group change which are estimated by the estimation unit 460 is displayed in the lower portion of the window W2.

The message Me2 includes contents that request the authenticated user to check the group change information on another user, and the user who views the message Me2 determines whether the contents of the list Ir2 are correct. Here, a user name Tu2 of another user is "Mutsuo Watanabe", and the authenticated user is requested to check the group change information for another user. In addition, it is indicated that another user is changed from the development leader of the product "α" of the development department as indicated in "Old" to the project leader of the product "β" of the development department as indicated in "New".

In addition, here, the field "Contents" displays the details of the group change which are estimated by the estimation unit 460. In this case, the estimation unit 460 estimates that another user is excluded from the group of the product "α" and added to the group of the product "β". In addition, the estimation unit 460 estimates that the development leader is deleted, and the project leader is newly created and added.

Then, the user who checks the group change information presses a Yes button Bt2 when the contents are correct. Meanwhile, when the contents are incorrect, the user presses a No button Bt3.

Third Exemplary Embodiment

Next, a third exemplary embodiment of the information processing system 1 will be described. In the third exemplary embodiment, descriptions will be made on a case where a recommended correction to a group is further generated, and the user is enabled to check the recommended correction.

Figure 11:
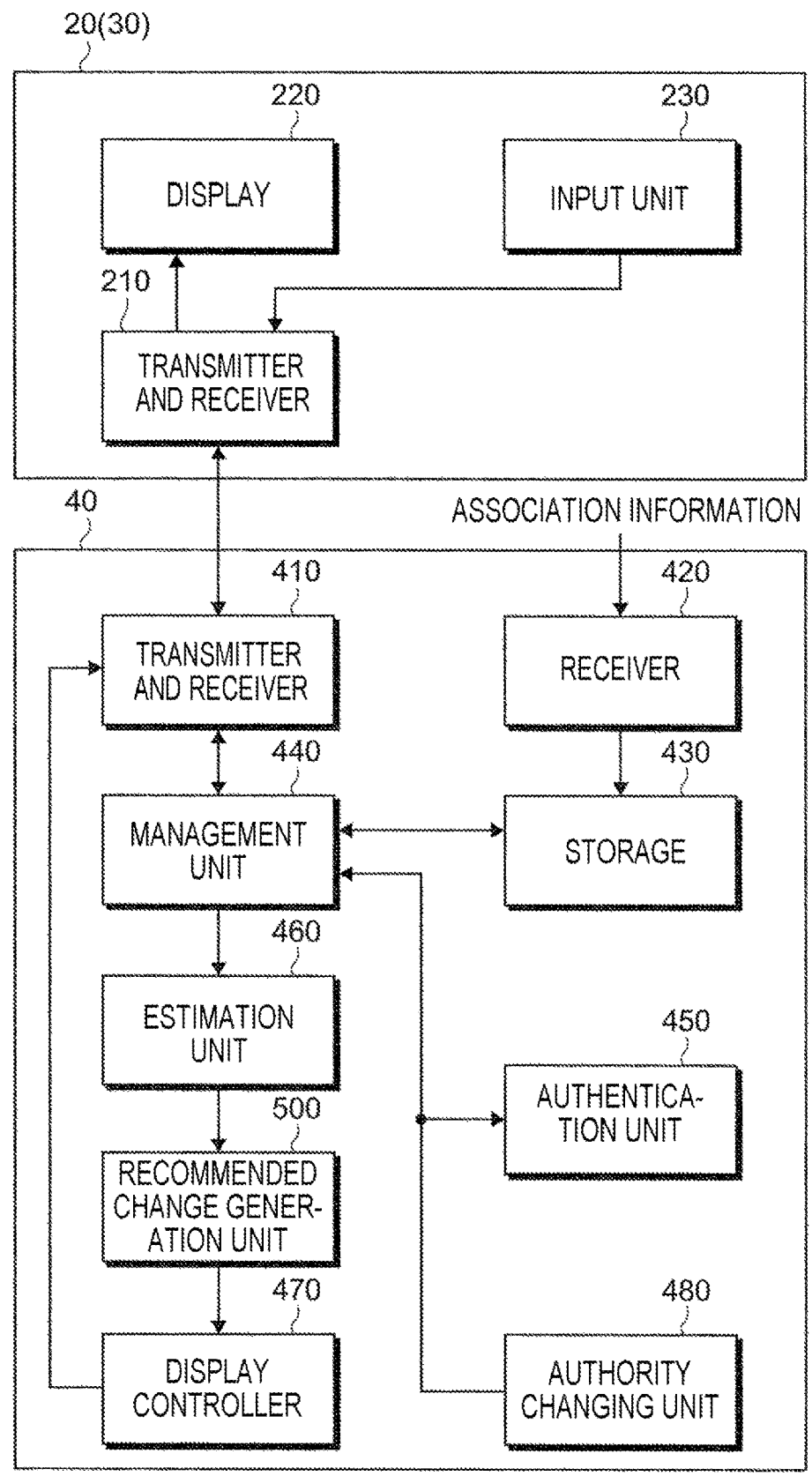
FIG. 11 is a block diagram illustrating a functional configuration according to a third exemplary embodiment of the information processing system.

FIG. 11 is a block diagram illustrating a functional configuration according to the third exemplary embodiment of the information processing system 1.

The information processing system 1 of the present exemplary embodiment is identical to that of the first exemplary embodiment illustrated in FIG. 4 and different therefrom in that the information processing system 1 of the present exemplary embodiment includes a recommended change generation unit 500 that generates a recommended correction to a group as the group change information. Thus, hereinafter, descriptions will be made focusing on the recommended change generation unit 500.

The recommended change generation unit 500 is an example of a recommended change generation unit, and estimates a correction as input by the user in the field "Correction" in FIG. 7B, and generates the correction as a recommended correction in advance. That is, the "recommended correction" is information that represents estimated contents of a correction which are obtained in the manner that the recommended change generation unit 500 estimates a correction to be input by the user. In addition, the user checks the recommended correction, and when the recommended correction is incorrect, the user performs a correction as described above in FIG. 7B.

Figure 12:
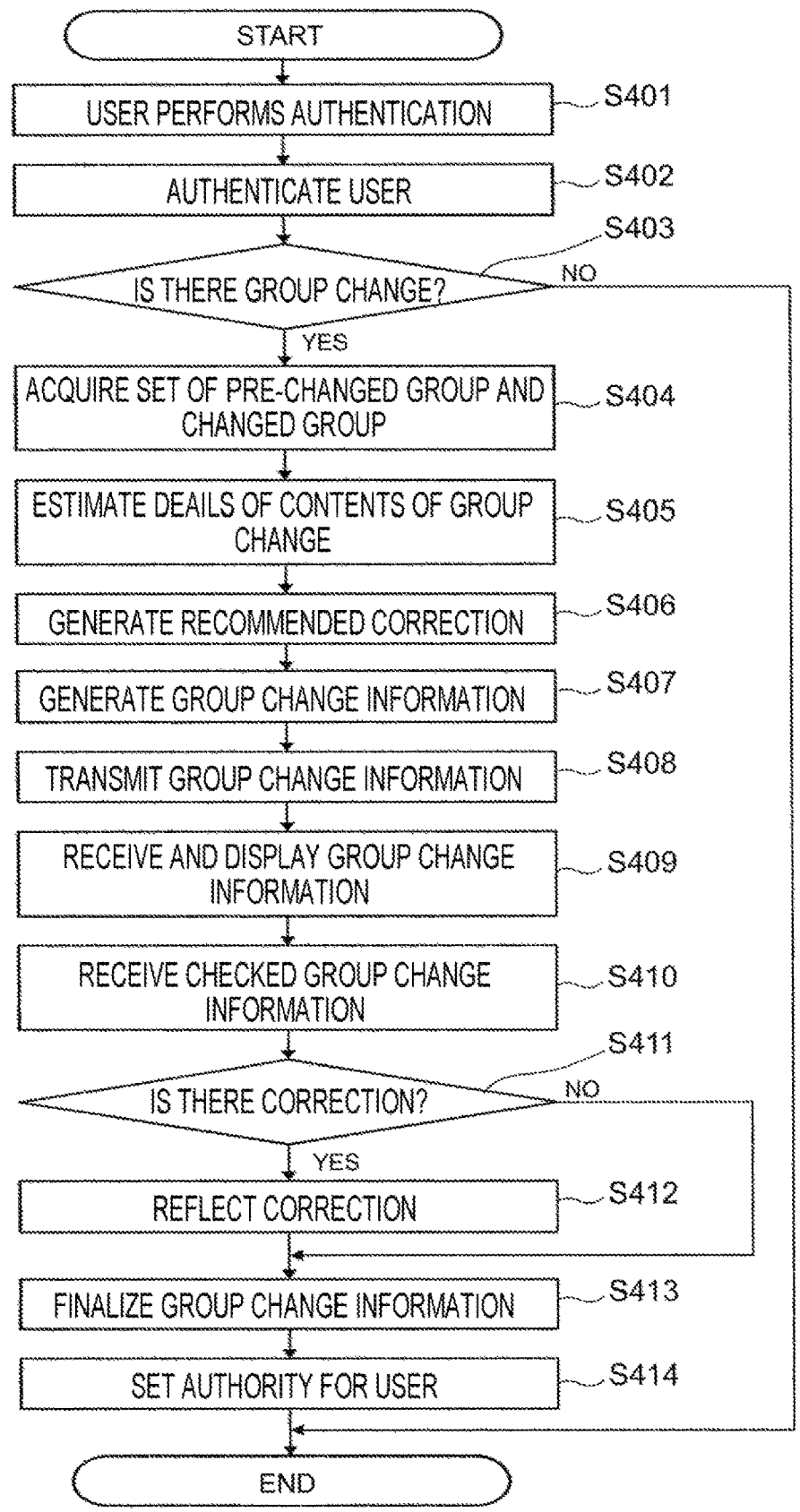
FIG. 12 is a flowchart for explaining a process of enabling a user to check group change information, as an operation of the information processing system according to the third exemplary embodiment.

FIG. 12 is a flowchart for explaining a process of enabling the user to check the group change information, as the operation of the information processing system 1 according to the third exemplary embodiment.

In addition, since steps 401 to 405 are the same as steps 201 to 205 described above with reference to FIG. 6, descriptions thereof will be omitted.

In and after step 406, based on the contents of the group change which are estimated by the estimation unit 460, the recommended change generation unit 500 generates a recommended correction for the user who has a group change (step 406). Although described in detail later, specifically, the recommended change generation unit 500 generates a recommended correction for a name change of a group, a division of a group, and an integration of groups.

Next, the display controller 470 generates the group change information including the recommended correction (step 407).

Further, the transmitter and receiver 410 transmits the group change information including the recommended correction, to the terminal device 20 (step 408).

In the terminal device 20, the transmitter and receiver 210 receives the group change information including the recommended correction, and the display 220 performs a display (step 409).

Then, the user who views the group change information including the recommended correction checks the group change information including the recommended correction, and performs a further correction when the recommended correction is incorrect. That is, a further recommended correction is made as the group change information, and checked by the user. Then, the management unit 440 receives the checked group change information via the transmitter and receiver 210 of the terminal device 20 and the transmitter and receiver 410 of the management server 40 (step 410).

Subsequent steps 411 to 414 are the same as steps 210 to 213 described above with reference to FIG. 6.

Figure 13:
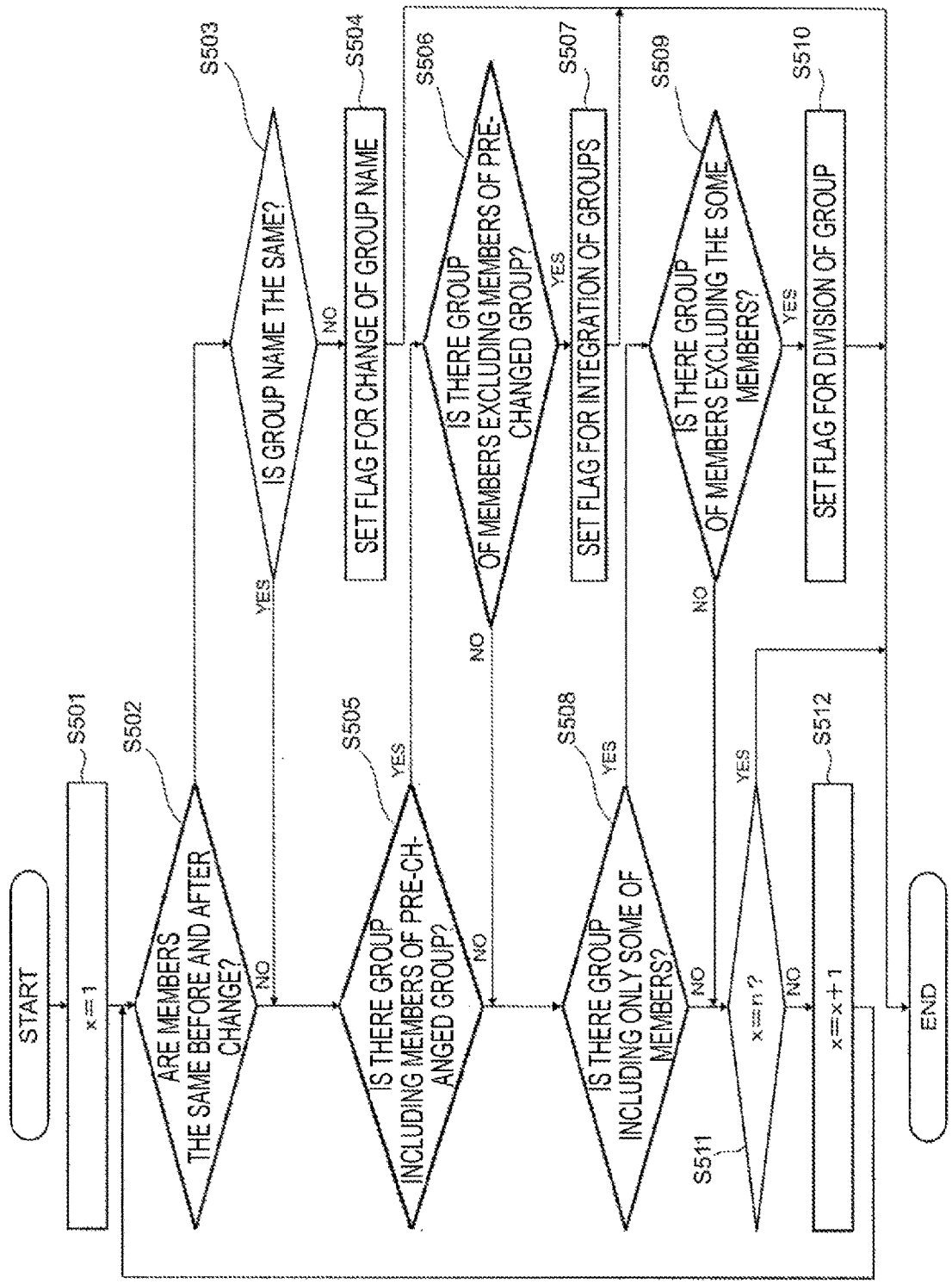
FIG. 13 is a flowchart for more specifically explaining a process of generating a recommended correction in an estimation unit.

FIG. 13 is a flowchart for more specifically explaining the process of generating the recommended correction in the estimation unit 460.

First, a parameter "x" that indicates how many groups are there from the first group to the group in interest is set to 1 (step 501). That is, here, first, it indicates that a first group is set. In addition, it is assumed that the "n" refers to the total number of group.

Next, the estimation unit 460 searches whether a group of the same members as those of the pre-changed group exists in the changed groups (step 502).

As a result, when the corresponding group exists (Yes in step 502), the estimation unit 460 compares the group names of the groups and determines whether the group names are the same (step 503).

Then, when it is determined that the group names are different from each other (No in step 503), the estimation unit 460 determines that the group name has been changed, and sets a flag for the name change of the group (step 504).

Figure 14:
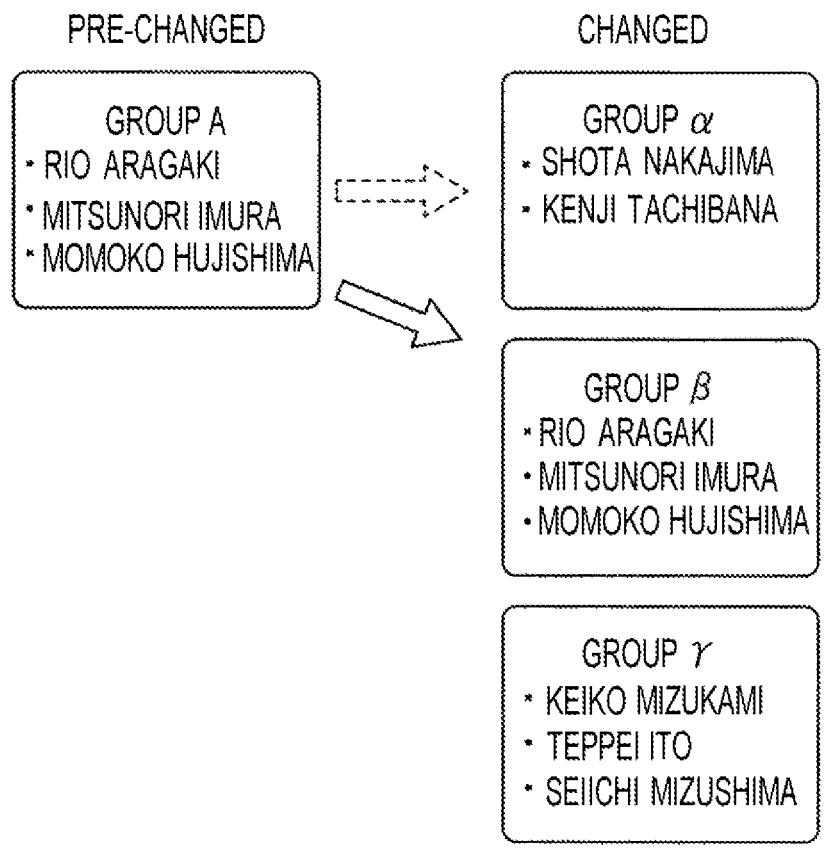
FIG. 14 is a view illustrating a case where a name change of a group is performed as a group change.

FIG. 14 is a view illustrating a case where the name change of the group is performed as a group change.

The illustrated group A is the pre-changed group and includes three members. In addition, FIG. 14 illustrates a case where the group name is changed to the group β as a changed group while maintaining the members. This case corresponds to the case of step 502 where a group of the same members as those of the pre-changed group exists in changed groups. Further, this case corresponds to the case of step 503 where the group names are different from each other.

Referring back to FIG. 13, when it is determined in step 502 that the corresponding group does not exist (No in step 502), and when it is determined in step 503 that the group names are the same (Yes in step 503), the estimation unit 460 searches whether a group including the members of the pre-changed group exists in changed groups, as a subsequent process (step 505).

As a result, when it is determined that the corresponding group exists (Yes in step 505), the estimation unit 460 searches whether a group of the members excluding the members of the pre-changed group exists in pre-changed groups (step 506).

Then, when it is determined that the corresponding group exists (Yes in step 506), the estimation unit 460 determines that an integration with the group searched in step 506 has been performed, and sets a flag of the integration of groups (step 507).

Figure 15A:
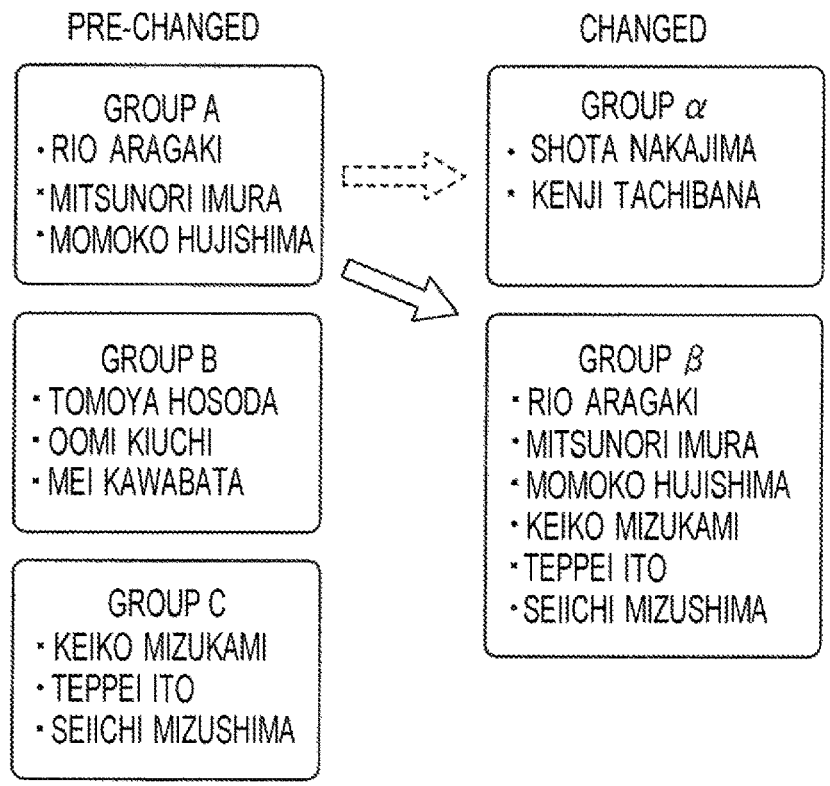
FIGS. 15A and 15B are views illustrating a case where an integration of groups is performed as a group change.
Figure 15B:
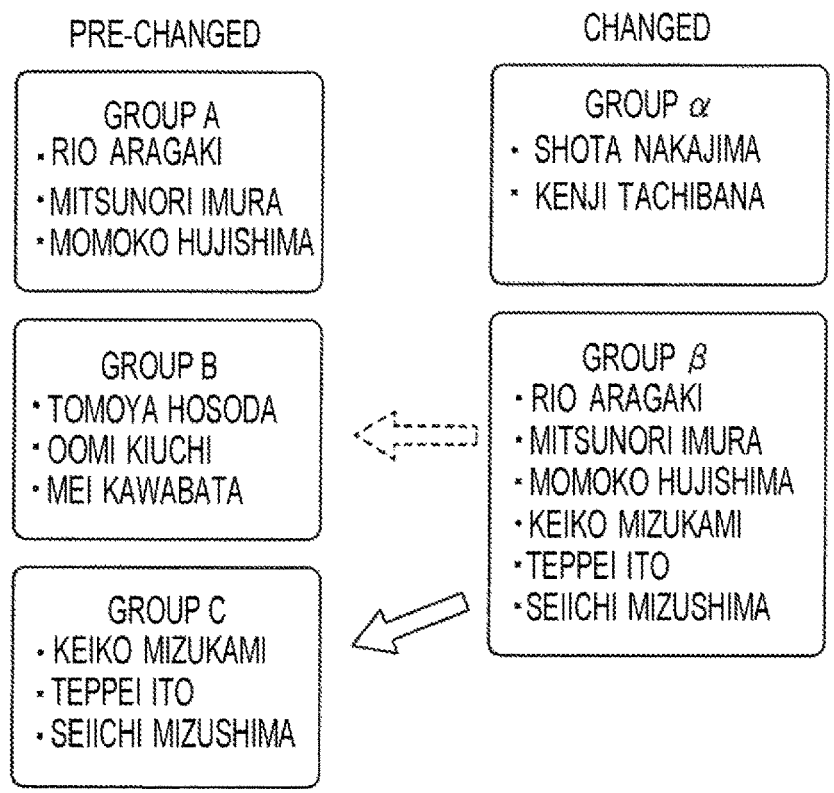

FIGS. 15A and 15B are views illustrating a case where an integration of groups is performed as a group change.

In this case, FIGS. 15A and 15B illustrate a case where a group A and a group C which are pre-changed groups are integrated into a group β after the group change.

At this time, in step 505, the estimation unit 460 searches whether a group including the three members of the pre-changed group A exists in changed groups. As a result, as illustrated in FIG. 15A, the estimation unit 460 determines that the group β corresponds to the group including the three members of the pre-changed group A.

Further, in step 506, the estimation unit 460 searches whether a group of the members excluding the members of the pre-changed group exists in the pre-changed groups. As a result, as illustrated in FIG. 15B, the estimation unit 460 determines that the group C corresponds to the group of the members excluding the members of the pre-changed group. Then, the estimation unit 460 determines that the group A and the group C which are the pre-changed groups have been integrated into the group β.

Referring back to FIG. 13, when it is determined in step 505 that the corresponding group does not exist (No in step 505), and when it is determined in step 506 that the corresponding group does not exist (No in step 506), the estimation unit 460 searches whether a group including only some of members of an pre-changed group exists in changed groups, as a subsequent process (step 508).

As a result, when it is determined that the corresponding group exists (Yes in step 508), the estimation unit 460 searches whether a group including the members excluding the some members exists in the changed groups (step 509).

Then, when it is determined that the corresponding group exists (Yes in step 509), the estimation unit 460 determines that the pre-changed group has been divided, and sets a flag for the division of the group (step 510).

Meanwhile, when it is determined in step 508 that the corresponding group does not exist (No in step 508), and when it is determined in step 509 that the corresponding group does not exist (No in step 509), the estimation unit 460 determines whether there is an undetermined group, as a subsequent process (step 511). This process is performed according to whether the parameter "x" is n. That is, when x=n, it may be determined that there is no undetermined group. Meanwhile, when x n, it may be determined that there is an undetermined group.

As a result, when it is determined that there is no undetermined group (Yes in step 511), that is, when x=n, the series of processes are ended.

Meanwhile, when it is determined that there is an undetermined group (No in step 511), that is, when x≠n, 1 is added to x (x=x+1) (step 512), and the process returns to step 502.

Figure 16A:
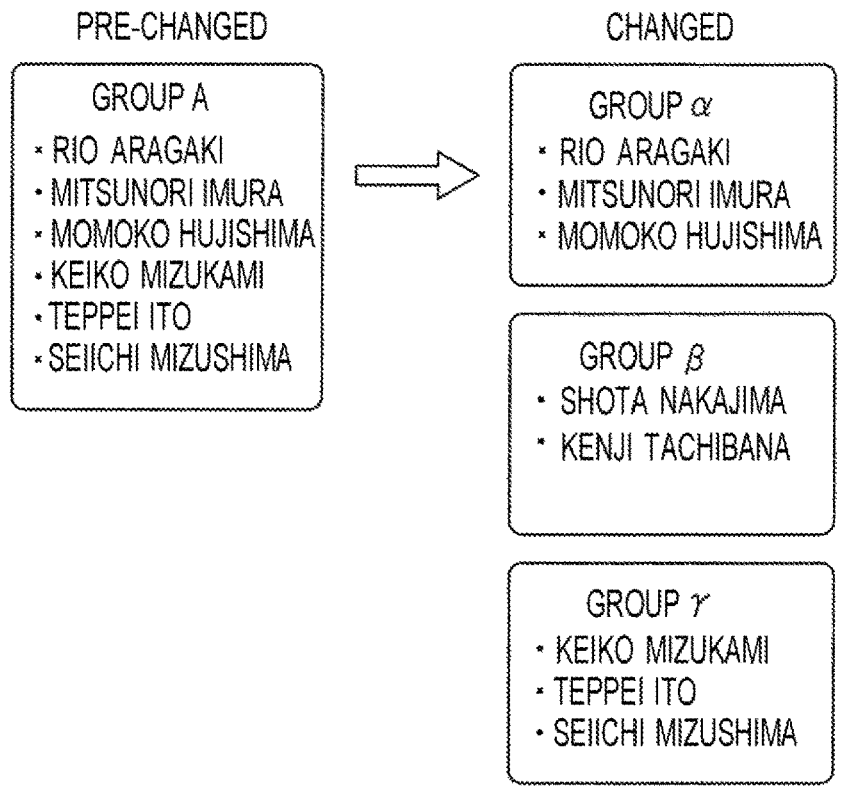
FIGS. 16A and 16B are views illustrating a case where a division of a group is performed as a group change.
Figure 16B:
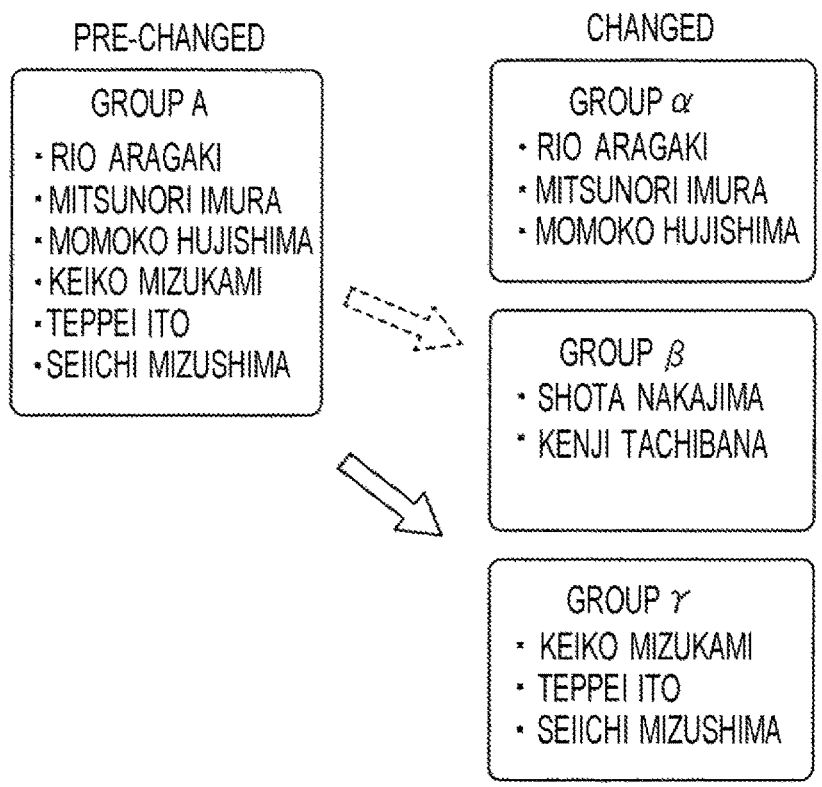

FIGS. 16A and 16B are views illustrating a case where a division of a group is performed as a group change.

In this case, FIGS. 16A and 16B illustrate a case where a group A which is a pre-changed group is divided into a group α and a group γ after the group change.

At this time, in step 508, the estimation unit 460 searches whether a group including only some of the members of the pre-changed group exists in the changed groups. As a result, as illustrated in FIG. 16A, the estimation unit 460 determines that the group β corresponds to the group including only some of the members of the pre-changed group.

Further, in step 509, the estimation unit 460 searches whether a group including the members excluding the some members exists in the changed groups. As a result, as illustrated in FIG. 16B, the estimation unit 460 determines that the group γ corresponds to the group including the members excluding the some members. Then, the estimation unit 460 determines that the group A which is the pre-changed group have been divided into the group α and the group γ after the group change.

Figure 17:
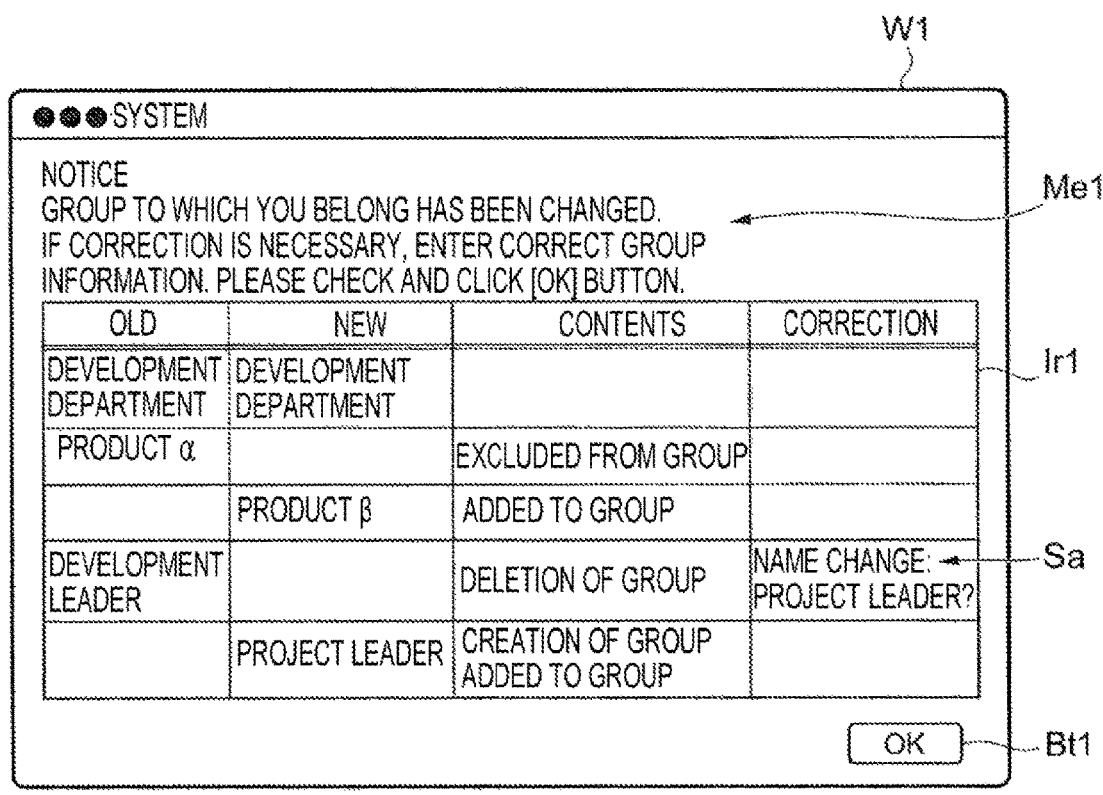
FIG. 17 is a view illustrating a case where group change information is displayed according to the third exemplary embodiment.

FIG. 17 is a view illustrating a case where the group change information is displayed according to the third exemplary embodiment.

As described above, the group change information according to the third exemplary embodiment includes a recommended correction.

FIG. 17 is identical to the group change information illustrated in FIG. 7A but different therefrom in that the group change information in FIG. 17 further displays a recommended correction Sa. That is, the display 220 displays the group change information as the window W1, and displays the message Me1 and the list Ir1 of specific contents of the group change which are estimated by the estimation unit 460. Further, in the list Ir1, the recommended correction Sa which is estimated by the estimation unit 460 is displayed. In this case, the recommended correction Sa indicates that the name of the development leader has been changed to the project leader, as the estimation result. In addition, the user may change the recommended correction Sa.

According to the exemplary embodiments described above, in the information processing apparatus that manages a user and a group to which the user belongs in association with each other, the management server 40 may estimate group change information which is contents of a group change in response to a change of association information in which the user and the group to which the user belongs are associated with each other.

<Description of Program>

Here, in the exemplary embodiments described above, the process performed by the management server 40 is prepared as, for example, a program such as application software. In addition, the process performed by the management server 40 is implemented in the manner that software and hardware resources cooperate with each other.

Thus, in the present exemplary embodiments, the process performed by the management server 40 may be construed as a program which causes a computer to execute a management function that manages association information in which a user and a group to which the user belongs are associated with each other, a reception function that receives a change of the association information, and a display control function that controls to display group change information toward the user, the group change information being contents of a group change that the reception function estimates in response to the association information.

In addition, the program for implementing the present exemplary embodiments may be provided by a communication unit or may be provided in a state of being stored in a recording medium such as a CD-ROM.

While the present exemplary embodiments have been described, the technical scope of the present disclosure is not limited to the scope described above in the exemplary embodiments. From the descriptions in the claims, it is clear that the technical scope of the present disclosure also includes various changes or modifications of the present exemplary embodiments.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a management unit configured to manage association information in which a user and a group to which the user belongs are associated with each other;
   a receiver configured to receive a changed association information which contains a changed group name; and
   a display controller configured to control display of group change information toward the user, wherein the group change information indicates at least one of a creation of a new group and a deletion of an existing group in response to receipt of the changed group name,
   wherein ability for the user to access a specific device or data via the information processing apparatus is based on an authority assigned to the group to which the user belongs,
   the association information contains a name of the user and a pre-changed group name associated with each other,
   the changed association information contains the name of the user and the changed group name, and
   the group change information further indicates which group the user is excluded from and/or added to.

2. The information processing apparatus according to claim 1, wherein the user to whom the group change information is displayed is a person who has input the changed association information.

3. The information processing apparatus according to claim 2, further comprising:
   a finalization unit configured to
      enable the user to check the group change information, and
      finalize the association information based on the checked group change information.

4. The information processing apparatus according to claim 3, wherein when there is the group change information that has not been finalized by the user who inputs the association information, the finalization unit enables the user related to the change of the association information to finalize the group change information.

5. The information processing apparatus according to claim 3, further comprising:
   an authority changing unit configured to change an authority of the user for a specific device or data based on the association information finalized by the finalization unit.

6. The information processing apparatus according to claim 1, wherein the user to whom the group change information is displayed is a user related to the changed association information.

7. The information processing apparatus according to claim 6, further comprising:
   a finalization unit configured to
      enable the user to check the group change information, and
      finalize the association information based on the checked group change information.

8. The information processing apparatus according to claim 7, wherein when there is the group change information that has not been finalized by the user who inputs the association information, the finalization unit enables the user related to the change of the association information to finalize the group change information.

9. The information processing apparatus according to claim 7, further comprising:
   an authority changing unit configured to change an authority of the user for a specific device or data based on the association information finalized by the finalization unit.

10. The information processing apparatus according to claim 1, wherein the user to whom the group change information is displayed is a user who belongs to a group related to the changed association information but is not recorded in the changed association information.

11. The information processing apparatus according to claim 10, further comprising:
a finalization unit configured to
enable the user to check the group change information, and
finalize the association information based on the checked group change information.

12. The information processing apparatus according to claim 11, wherein when there is the group change information that has not been finalized by the user who inputs the association information, the finalization unit enables the user related to the change of the association information to finalize the group change information.

13. The information processing apparatus according to claim 11, further comprising:
an authority changing unit configured to change an authority of the user for a specific device or data based on the association information finalized by the finalization unit.

14. The information processing apparatus according to claim 1, further comprising:
a recommended change generation unit configured to present a recommended correction to a group as the group change information, wherein
the user is enabled to check the recommended correction.

15. The information processing apparatus according to claim 14, wherein the recommended change generation unit generates the recommended correction for a name change of a group, a division of a group, and an integration of groups.

16. The information processing apparatus according to claim 1, further comprising:
a finalization unit configured to finalize the association information based on an input from the user that indicates the changed group name means a name change of the existing group and does not mean the creation of the new group or the deletion of the existing group.

17. The information processing apparatus according to claim 16, wherein
the authority of the group before the name change is identically given as the authority of the group after the name change based on the association information finalized by the finalization unit.

18. A non-transitory computer readable medium storing a program that causes a computer to execute information processing, the information processing comprising:
managing association information in which a user and a group to which the user belongs are associated with each other;
receiving a changed association information which contains a changed group name; and
controlling to display group change information toward the user, wherein the group change information indicates at least one of a creation of a new group and a deletion of an existing group in response to receipt of the changed name,
wherein ability for the user to access a specific device or data via the information processing apparatus is based on an authority assigned to the group to which the user belongs, wherein
the association information contains a name of the user and a pre-changed group name associated with each other,
the changed association information contains the name of the user and the changed group name, and
the group change information further indicates which group the user is excluded from and/or added to.

19. An information processing apparatus comprising:
a management unit configured to manage association information in which a user and a group to which the user belongs are associated with each other;
a receiver configured to receive a changed association information which contains a changed group name;
a display controller configured to control display of group change information toward the user, wherein the group change information indicates at least one of a creation of a new group and a deletion of an existing group in response to receipt of the changed group name,
wherein ability for the user to access a specific device or data via the information processing apparatus is based on an authority assigned to the group to which the user belongs; and
a finalization unit configured to finalize the association information based on an input from the user that indicates the changed group name means a name change of the existing group and does not mean the creation of the new group or the deletion of the existing group.

* * * * *